United States Patent [19]

Tulley

[11] Patent Number: 4,977,755
[45] Date of Patent: Dec. 18, 1990

[54] EVAPORATIVE COOLER LINER

[76] Inventor: R. Mark Tulley, 1509 Martha NE., Albuquerque, N. Mex. 87112

[21] Appl. No.: 437,532

[22] Filed: Nov. 16, 1989

[51] Int. Cl.⁵ .............................................. F28D 5/00
[52] U.S. Cl. ..................................... 62/304; 226/404
[58] Field of Search ................. 62/304; 220/404, 403, 220/408, 410

[56] References Cited

U.S. PATENT DOCUMENTS

| | | | |
|---|---|---|---|
| 2,831,610 | 4/1958 | Dennie | 220/403 X |
| 3,392,825 | 7/1968 | Gale et al. | 220/404 |
| 4,154,355 | 5/1979 | Shackelford | 220/4 B |
| 4,282,984 | 8/1981 | Curry, Jr. | 220/404 |
| 4,497,418 | 2/1985 | Nunlist | 220/378 X |
| 4,687,604 | 8/1987 | Goettl | 261/29 |
| 4,715,572 | 12/1987 | Robbins, III et al. | 220/404 X |
| 4,878,590 | 11/1989 | Porter | 220/404 X |

OTHER PUBLICATIONS

Ultra Cool Flyer, Champion Cooler Corp., middle page of flyer (no date given).
Submarine Cooler Coating, Dial Manufacturing Inc., copy of product label (no date given).

Primary Examiner—William E. Tapolcai
Attorney, Agent, or Firm—Deborah A. Peacock; Robert W. Weig

[57] ABSTRACT

A liner for the reservoir of an evaporative cooler consisting of a tub or trough like article. The liner is made of a thin, flexible, water impermeable material and shaped to fit inside the reservoirs of existing coolers. In addition, the liner has flaps extending upwardly from each side which would fold to fit in between the pads and edges of the reservoir. The flaps provide a means for sealing the reservoir when the pads are in place.

8 Claims, 4 Drawing Sheets

EVAPORATIVE COOLER LINER

Background-Field of Invention

This invention relates to evaporitive coolers. Specifically to protecting and repairing the reservoirs of these coolers.

Background-Description of Prior Art

Evaporitive coolers are used in dry climates to cool buildings. These coolers must be serviced periodically. This service involves replacing the pads, cleaning and repairing the reservoir, and replacing any defective parts.

Heretofore, cleaning of the reservoir was accomplished by scrubbing and rinsing the material down a one inch drain. Because the bases of these reservoirs are flat and the drains are small, wash water drains slowly. Therefore, suspended material settles requiring several rinsings for a thorough cleaning. In addition to cleaning, leaks must be repaired and the reservoir must be protected from corrosion. Heretofore this protection was provided by applying a undercoating material sold under the brand name of Submarine Cooler Coating. This product is manufactured by Dial Manufacturing, 2252 Grand Avenue, Phoenix, AZ. 85009. Application of this coating requires draining the reservoir. Removal of rust, dirt, grease or loose material. The areas of the cooler not to be coated must be protected by tape. The coating is then brushed or sprayed onto the surface of the reservoir. The coating must then dry before the reservoir may be filled with water.

This method has several disadvantages.
A. The coating produces fumes which are harmful if inhaled.
B. The coating must dry before the reservoir may be put in use
C. In cases of severe reservoir damage the coating alone will not repair the leak.

Objects and Advantages

The principal object of this invention is to provide a removable liner for a cooler reservoir which will make cleaning and repair easier. Further objects and advantages are:
A. To provide a liner which poses no health risk to install.
B. The reservoir may be filled with water immediately after the liner is installed, thereby providing a one step process for repair.
C. The proper size liner will seal any reservoir no matter how severely damaged.

Further objects and advantages will become apparent from a consideration of the ensuing description and drawings.

Drawing Figures

Reference Numerals in Drawings

| | |
|---|---|
| 10. Cooler housing | 20. Flaps |
| 12. Removable pads | 22. Threaded pipe |
| 14. Cooler reservoir | 24. Added washer |
| 16. Overflow drain assembly | 26. Added nut |
| 18. Evaporative cooler liner | 28. Existing washer |

Description-Figures 1 through 8

Figure 1:
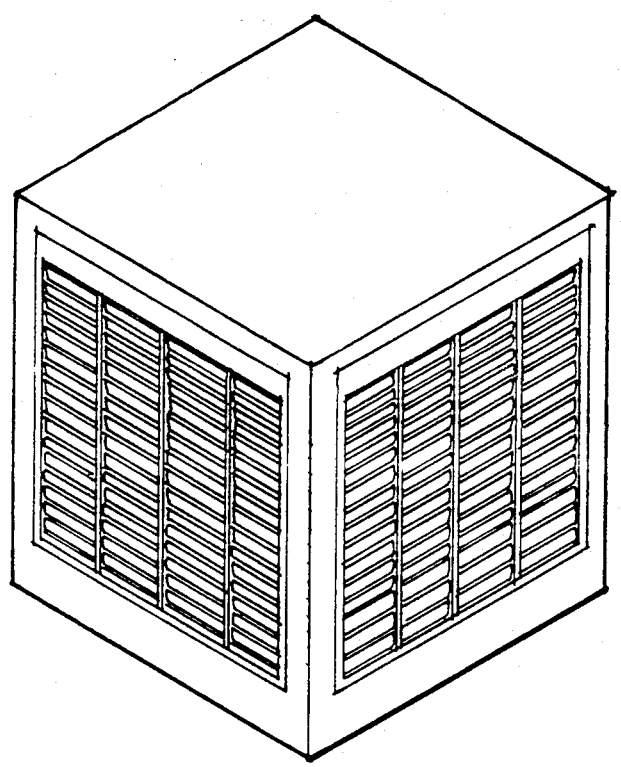
FIG. 1 is a perspective view of a typical evaporative cooler.
Figure 2:
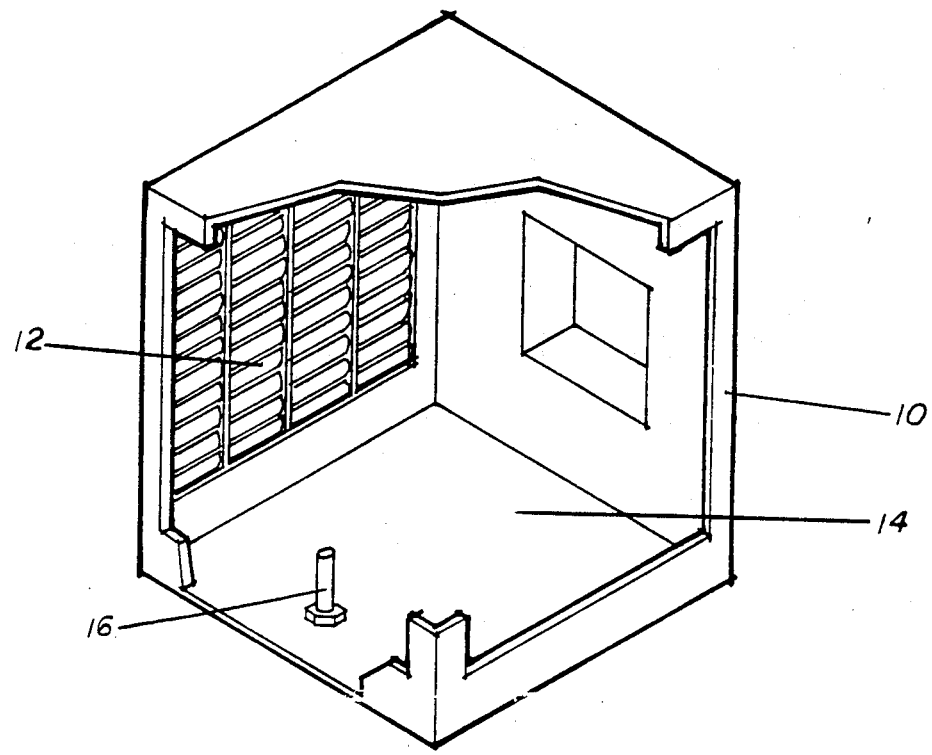
FIG. 2 is a perspective cut away view of the cooler exposing the reservoir and overflow drain assembly.

FIG. 1 shows a typical evaporative cooler. FIG. 2 shows a cut away of the cooler with two pads 12 removed. For the purpose of this description the cooler consists of a housing 10, removable pads 12, and a reservoir 14 with a removable overflow drain assembly 16.

Figure 3:
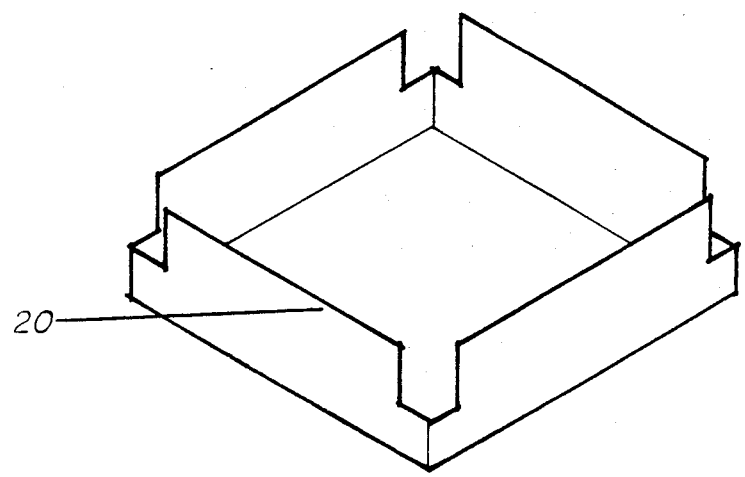
FIG. 3 is a perspective view of the evaporative cooler liner.

A typical embodiment of the present invention is illustrated in FIG. 3. Evaporative cooler liner 18 is a tub like article in the shape of reservoir 14 and having four flaps 20. Each flap 20 is the width of pad 12.

Figure 4:
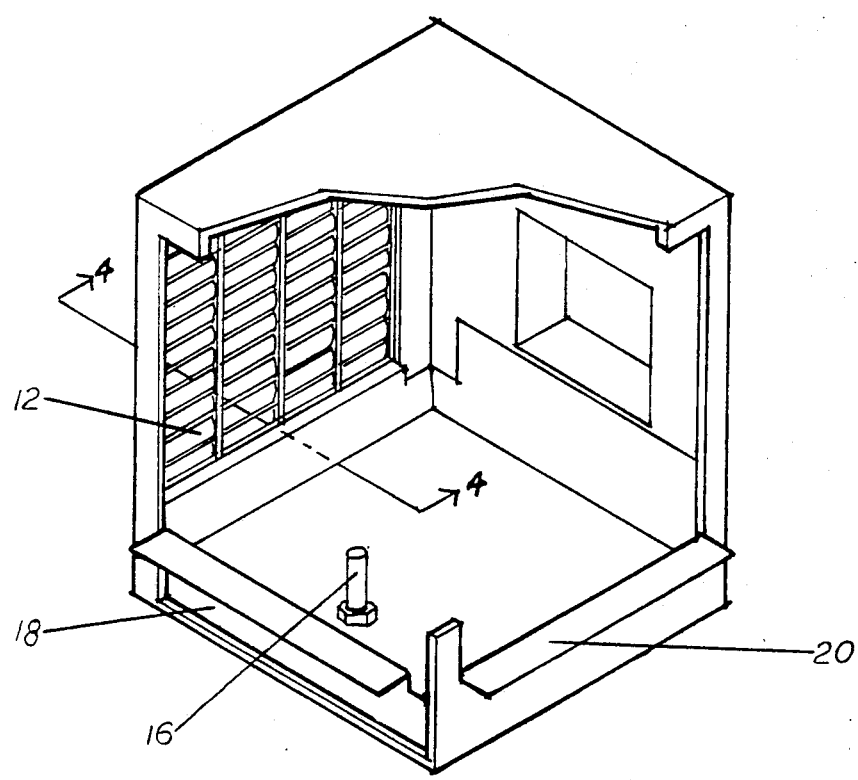
FIG. 4 is a cut away views of the cooler with the liner installed.
Figure 5:
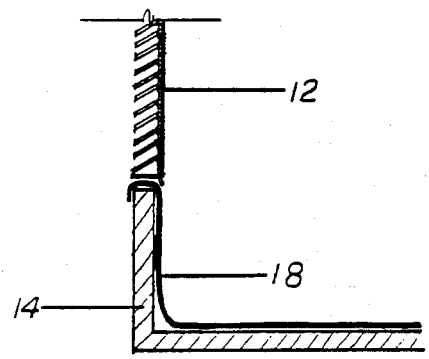
FIG. 5 is sectional view 44 showing where the liner would seat with the pads installed.

In the preferred embodiment liner 18 would be pressure or vacuum formed of a thin flexible vinyl. However, the invention could be made of any water impermeable material such as metal, plastic, polyethylene, polypropyline, laminated paper, nylon, rubber, etc. Liner 18 would be manufactured in various sizes to fit coolers in existence. Liner 18 would be made in a thickness which would allow flaps 20 to be folded over the edges of reservoir 14 as shown in FIG. 4. In addition flaps 20 must be thin enough so as not to interfere with the replacement of pads 12. FIG. 5 is sectional view 44 showing how liner 18 would seat in between pad 12 and reservoir 14 with pad 12 in place.

Figure 6:
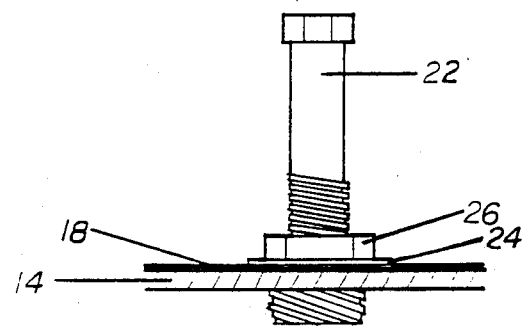
FIG. 6 is a detailed view of one type of overflow drain assembly currently in use.
Figure 6A:
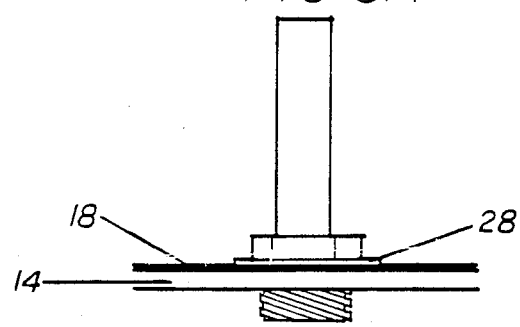
FIG. 6A is a detailed view of a second type of overflow drain assembly currently in use.

FIG. 6 and 6A are details of overflow drain 16. FIG. 6 shows where liner 18 would sit in a threaded pipe 22 overflow drain 16. In FIG. 6 a washer 24 and nut 26 have been added to the parts of drain assembly 16. FIG. 6A shows a different type of drain assembly 16. In FIG. 6A no additional parts are needed. Existing washer 28 goes on top of liner 18.

Figure 7:
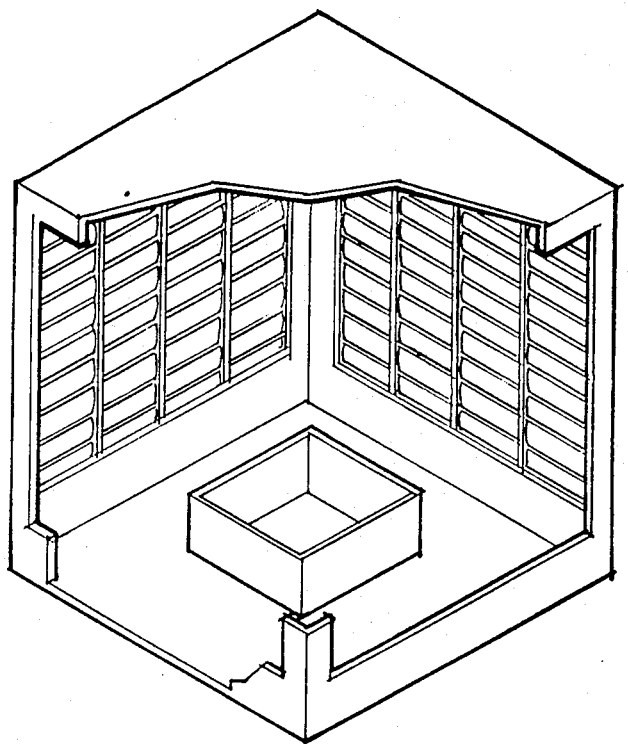
FIG. 7 shows a down draft type evaporative cooler.
Figure 8:
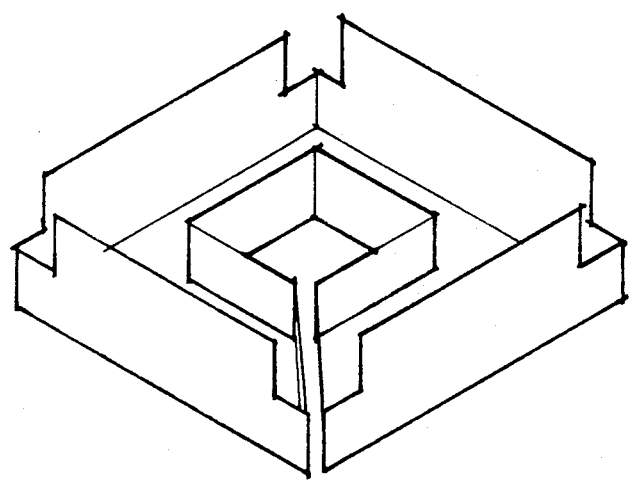
FIG. 8 shows another embodiment of the invention for use with down draft type coolers.

FIG. 7 is a cut away view of a down draft type cooler. FIG. 8 is a perspective view of a different embodiment of the invention. The embodiment in FIG. 8 is a trough like article designed for use with down draft type coolers.

Operation - FIGS. 2, 3, 4, 5, 6, 6A

To use evaporative cooler liner 18 one must first remove pads 12 and drain 16 shown in FIG. 2. Liner 18 is then inserted into reservoir 14. FIG. 4 shows a typical cooler with liner 18 inserted. Next fold flaps 20 over the edges of reservoir 14 as shown in FIG. 4. A hole must then be cut in liner 18 for overflow drain 16. The location of drain 16 varies by cooler manufacturer; therefore, this hole is cut by the user. Overflow drain 16 is then replaced.

There are two types of overflow drain assembles 16 commonly in use. The first type is shown in FIG. 6. The addition of washer 24 and nut 26 to threaded pipe 22 provide a method of sealing the hole cut in liner 18. FIG. 6A shows the second type of overflow drain 16 currently in use. In this case, no additional parts are required to seal the hole. Replacement of drain 16 with existing washer 28 on top of liner 18 will seal the hole.

Reservoir 14 is then filled with water. pads 12 are now replaced with flaps 20 seated between reservoir 14 and pads 12 as shown in FIG. 5.

Summary, Ramifications, and Scope

Accordingly, the reader will see the evaporative cooler liner of this invention will seal the reservoirs of coolers quickly and easily. In addition it will simplify the cleaning and repair of these reservoirs. Furthermore the liner has the additional advantages in that:

It can be replaced when needed.

It can be used without exposure to hazardous fumes.

It is easily removed which will simplify cleaning.

It eliminates the drying time required by the coating material previously used.

It will seal severe reservoir damage by providing a false bottom for the reservoir.

It will extend the life of the cooler by protecting the reservoir from corrosion.

Although the description above contains specificities, these should not be construed as limiting the scope of the invention but merely providing illustrations of the presently preferred embodiment of this invention.

For example, the liner may have other shapes or sizes, the drain hole may be pre-cut, the flaps may be folded at the time of manufacturing or a rolled edge may be used instead of flaps, the flaps may be thinner or of a different material than the rest of the liner, other materials may be used, etc.

Thus the scope of the invention should be determined by the appended claim, and its legal equivalent, rather than by the examples given.

I claim:

1. A waterproof liner for use with a side draft evaporative cooler having a base, preselected base dimensions, side walls extending upwardly therefrom, and removable pads, the bottoms of which pads engage the tops of the side walls, said liner comprising:

a flexible waterproof tub-shaped article, fittable into the base of the evaporative cooler, said article comprising a liner bottom portion cuttable by an installer to provide an aperture for an overflow drain pipe, and liner side walls which in combination with said bottom portion, line and thereby waterproof of the base of the cooler; and flap retention assistance means attached to said liner sidewalls of said article, said flap retention assistance means being extendible over the sidewalls of the cooler base, said flap retention assistance means being engageable with the removable pads when the removable pads are disposed in place for assisting and retaining said article in position in the cooler base.

2. The invention of claim 1 wherein said article comprises at least one material selected from the group consisting of plastic, rubber, metal, laminated paper and vinyl.

3. The invention of claim 1 wherein said flap retention assistance means are constructed of thinner material than said article.

4. The invention of claim 1 wherein said flap retention assistance means are integrally formed with said article.

5. A waterproof liner for use with a down draft evaporative cooler having a base, a preselected base dimension, side walls extending upwardly therefrom, the base containing a walled air duct, and the cooler having removable pads, the bottoms of which pads engage the tops of the side walls said liner comprising:

a flexible waterproof trough-shaped article, fittable into the base of the evaporative cooler, said article comprising a liner bottom portion cuttable by an installer to provide an aperture for an overflow drain pipe, outside liner side walls which engage the cooler base side walls, and inside liner side walls which surround and engage the air duct wall, said outside line side walls and said inside liner side walls in combination with said bottom portion, line and thereby waterproof the base of the cooler; and flap means attached to said liner side walls of said article, said flap means being extendible over the side walls of the cooler base, whereby when the removable pads are disposed in place, the pads engage said flap means and thereby assist in retaining said article in position in the cooler base.

6. The invention of claim 5 wherein said article comprises at least one material selected from the group consisting of plastic, rubber, metal, laminated paper and vinyl.

7. The invention of claim 5 wherein said flap means are constructed of thinner material than said article.

8. The invention of claim 5 wherein said flap means are integrally formed with said article.

* * * * *